(12) United States Patent
Bian

(10) Patent No.: US 12,442,977 B2
(45) Date of Patent: Oct. 14, 2025

(54) DUAL-LAYER EDGE COUPLERS WITH CURVED COUPLING-ASSISTANCE FEATURES

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 304 days.

(21) Appl. No.: 18/126,745

(22) Filed: Mar. 27, 2023

(65) Prior Publication Data
US 2024/0329299 A1    Oct. 3, 2024

(51) Int. Cl.
G02B 6/12 (2006.01)
G02B 6/122 (2006.01)
G02B 6/125 (2006.01)

(52) U.S. Cl.
CPC ....... *G02B 6/12004* (2013.01); *G02B 6/1228* (2013.01); *G02B 6/125* (2013.01); *G02B 2006/12104* (2013.01); *G02B 2006/12121* (2013.01)

(58) Field of Classification Search
CPC .. G02B 6/12004; G02B 6/1228; G02B 6/125; G02B 2006/12104; G02B 2006/12121
See application file for complete search history.

(56) References Cited

U.S. PATENT DOCUMENTS

| | | | |
|---|---|---|---|
| 9,804,334 B2 | 10/2017 | Israel et al. | |
| 10,649,140 B1 | 5/2020 | Bian et al. | |
| 11,204,469 B1* | 12/2021 | Krueger | G02B 6/305 |
| 2020/0088942 A1* | 3/2020 | Bian | G02B 6/125 |
| 2021/0088724 A1* | 3/2021 | Liu | G02B 6/1228 |
| 2021/0141154 A1* | 5/2021 | Razdan | G02B 6/12002 |
| 2021/0165165 A1 | 6/2021 | Israel et al. | |
| 2022/0252785 A1* | 8/2022 | Bian | G02B 6/1225 |

OTHER PUBLICATIONS

Israel Abraham et al: "Photonic plug for scalable silicon photonics packaging", SPIE Proceedings; SPIE, US, vol. 11286, Feb. 28, 2020, XP060129072, DOI: 10.1117/12.2543490 pp. 1128607-1128607, ISBN:978-1-5106-3673-6.

Chen Zhennan et al: "An efficient three-waveguide spot size converter using 180nm silicon photonic process node", Proceedings of the SPIE, SPIE, US, vol. 12169, Mar. 27, 2022, pp. 1216949-1216949, XP060153514, ISSN: 0277-786X, DOI: 10.1117/12.2624041, ISBN: 978-1-5106-5738-0.

European Patent Office, Extended European Search Report and Opinion issued in European Patent Application No. 23196123.6 on Feb. 21, 2024; 9 pages.

(Continued)

*Primary Examiner* — Michael P Mooney

(74) *Attorney, Agent, or Firm* — Thompson Hine LLP; Anthony Canale

(57) ABSTRACT

Structures for an edge coupler and methods of forming such structures. The structure comprises a semiconductor substrate, a first waveguide core including a curved section and an end that terminates the curved section, and a second waveguide core including a section disposed adjacent to the curved section of the first waveguide core. The first waveguide core is positioned between the second waveguide core and the semiconductor substrate.

20 Claims, 10 Drawing Sheets

(56) References Cited

OTHER PUBLICATIONS

Mu, Xin, Sailong Wu, Lirong Cheng, and H.Y. Fu. 2020. "Edge Couplers in Silicon Photonic Integrated Circuits: A Review" Applied Sciences 10, No. 4: 1538. https://doi.org/10.3390/app10041538.

Martin Papes et al., "Fiber-chip edge coupler with large mode size for silicon photonic wire waveguides," Optics Express 24, 5026-5038 (2016).

Niharika Kohli, Michael Ménard, and Winnie N. Ye, "Efficient TE/TM spot-size converter for broadband coupling to single mode fibers," OSA Continuum 2, 2428-2438 (2019).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al, "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

B. Bhandari, C. -S. Im, K. -P. Lee, S. -M. Kim, M. -C. Oh and S. -S. Lee, "Compact and Broadband Edge Coupler Based on Multi-Stage Silicon Nitride Tapers," in IEEE Photonics Journal, vol. 12, No. 6, pp. 1-11, Dec. 2020, Art No. 6602511, doi: 10.1109/JPHOT.2020.3036498.

Nguyen, Vinh Huu, In Ki Kim, and Tae Joon Seok. 2020. "Low-Loss and Broadband Silicon Photonic 3-dB Power Splitter with Enhanced Coupling of Shallow-Etched Rib Waveguides" Applied Sciences 10, No. 13: 4507. https://doi.org/10.3390/app10134507.

Teramount Photonic-Plug Technology, [retrieved on Dec. 9, 2022], retrieved from <URL: https://teramount.com/technology>.

Bian, Yusheng, "Edge Couplers With a High-Elevation Assistance Feature" filed on Jun. 29, 2022 as a U.S. Appl. No. 17/853,186.

Bian, Yusheng, "Stacked Edge Couplers in the Back-End-of-Line Stack of a Photonic Chip" filed on Apr. 5, 2022 as a U.S. Appl. No. 17/658,092.

\* cited by examiner

DUAL-LAYER EDGE COUPLERS WITH CURVED COUPLING-ASSISTANCE FEATURES

BACKGROUND

The disclosure relates to photonics chips and, more specifically, to structures for an edge coupler and methods of forming such structures.

Photonics chips are used in many applications and systems including, but not limited to, data communication systems and data computation systems. A photonics chip includes a photonic integrated circuit comprised of optical components, such as modulators, polarizers, and optical couplers, that are used to manipulate light received from a light source, such as a laser or an optical fiber.

An edge coupler, also known as a spot-size converter, is a type of optical coupler that is commonly used for coupling light of a given mode from the light source to the photonic integrated circuit. The edge coupler may include a section of a waveguide core that defines an inverse taper having a tip. In the edge coupler construction, the narrow end of the inverse taper at the tip that is positioned adjacent to the light source, and the wide end of the inverse taper is connected to another section of the waveguide core that routes the light to the photonic integrated circuit.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width dimension increases, the inverse taper can support the entire incident mode and confine the electromagnetic field.

Improved structures for an edge coupler and methods of forming such structures are needed.

SUMMARY

In an embodiment of the invention, a structure for an edge coupler is provided. The structure comprises a semiconductor substrate, a first waveguide core including a curved section and an end that terminates the curved section, and a second waveguide core including a section disposed adjacent to the curved section of the first waveguide core. The first waveguide core is positioned between the second waveguide core and the semiconductor substrate.

In an embodiment of the invention, a structure for an edge coupler is provided. The structure comprises a first waveguide core including a first tapered section and a first end that terminates the first tapered section, a second waveguide core including a second tapered section and a second end that terminates the second tapered section, and a third waveguide core including a third tapered section and a third end that terminates the third tapered section. The third tapered section is disposed in a lateral direction between the first tapered section of the first waveguide core and the second tapered section of the second waveguide core. The first tapered section has a first width dimension that decreases with increasing distance from the first end, the second tapered section has a second width dimension that decreases with increasing distance from the second end, and the third tapered section has a third width dimension that increases with increasing distance from the third end.

In an embodiment of the invention, a method of forming a structure for an edge coupler is provided. The method comprises forming a first waveguide core that includes a curved section and an end that terminates the curved section, and forming a second waveguide core that includes a section disposed adjacent to the curved section of the first waveguide core. The first waveguide core is positioned between the second waveguide core and a semiconductor substrate.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
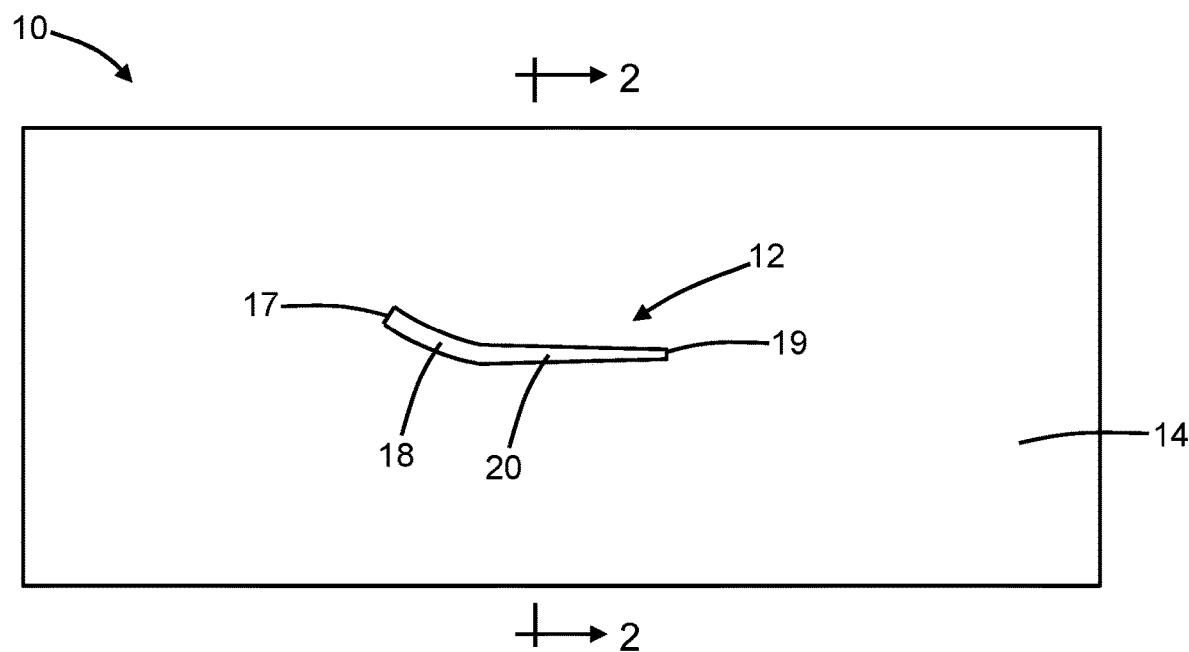
FIG. 1 is a top view of a structure at an initial fabrication stage of a processing method in accordance with embodiments of the invention.
Figure 2:
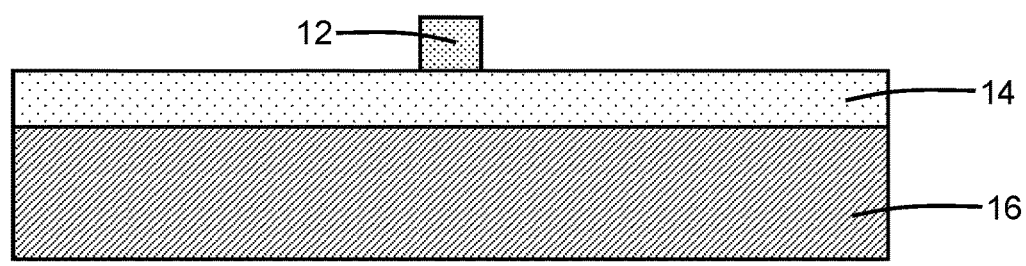
FIG. 2 is a cross-sectional view taken generally along line 2-2 in FIG. 1.

With reference to FIGS. 1, 2 and in accordance with embodiments of the invention, a structure 10 for an edge coupler includes a waveguide core 12 that is disposed on and over a dielectric layer 14 and a semiconductor substrate 16.

In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate, and the dielectric layer 14 may fully separate the waveguide core 12 from the semiconductor substrate 16. In an alternative embodiment, one or more additional dielectric layers comprised of, for example, silicon dioxide may be positioned between the waveguide core 12 and the dielectric layer 14.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon or polysilicon. In an embodiment, the waveguide core 12 may be formed by patterning a layer comprised of the constituent material with lithography and etching processes. In an embodiment, an etch mask may be formed by a lithography process over a layer of the constituent material of the waveguide core 12, and unmasked sections of the layer may be etched and removed by an etching process. The shape of the etch mask determines the patterned shape of the waveguide core 12. In an embodiment, the waveguide core 12 may be formed by patterning the semiconductor material, for example single-crystal silicon, of a device layer of a silicon-on-insulator substrate. In an embodiment, the waveguide core 12 may be formed by depositing a layer comprised of the constituent material, for example polysilicon, and patterning the deposited layer.

The waveguide core 12 includes a section 18 and a section 20 that is adjoined to the section 18. The waveguide core 12 is truncated at an end 17 that terminates the section 18 and an end 19 that terminates the section 20. The waveguide core 12 has a length between the opposite ends 17, 19 with the section 18 extending over a portion of the length and the section 20 extending over another portion of the length. In an embodiment, the section 18 may include a bend that curves in a lateral direction away from the section 20 to the end 17. In an embodiment, the section 20 may taper with a width dimension that decreases with decreasing distance from the end 19. In an embodiment, the width dimension of the section 20 may linearly increase with increasing distance from the end 19. In an alternative embodiment, the width dimension of the section 20 may change based on a non-linear function, such as a quadratic function, a cubic function, a parabolic function, a sine function, a cosine function, a Bezier function, or an exponential function. In an embodiment, the section 20 may have a uniform taper angle as a result of the increasing width dimension. In an alternative embodiment, the section 20 may taper in multiple stages characterized by different taper angles. In an alternative embodiment, the section 20 may be non-tapered.

Figure 3:
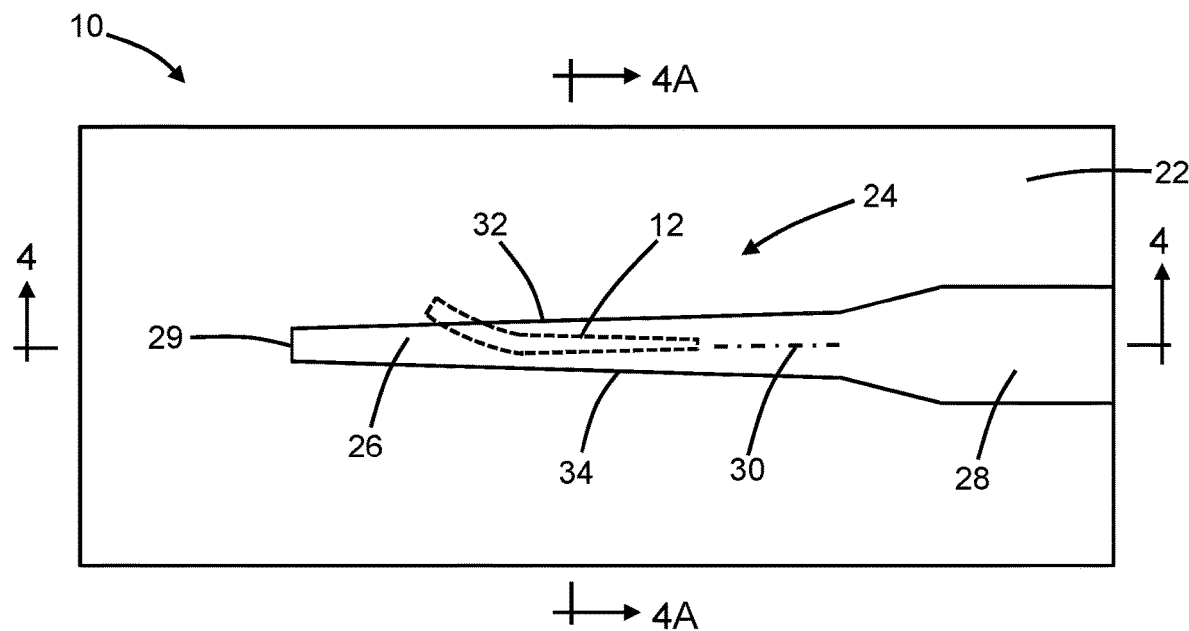
FIG. 3 is a top view of the structure at a fabrication stage of the processing method subsequent to FIG. 1.
Figure 4:
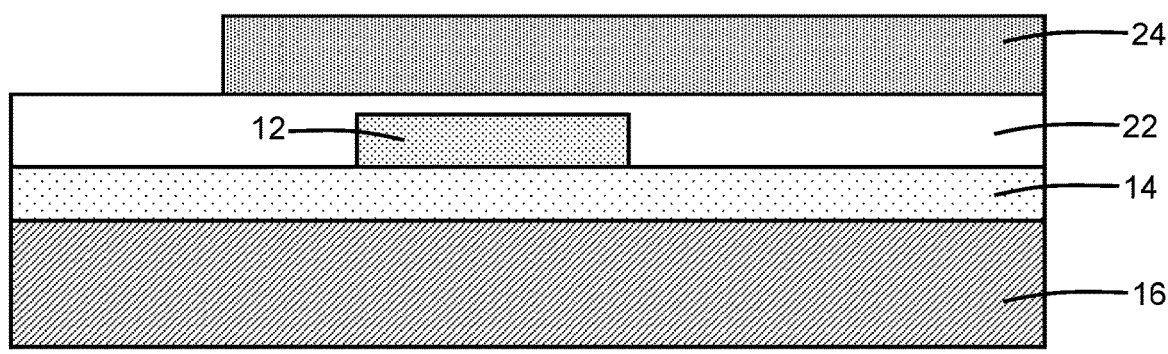
FIG. 4 is a cross-sectional view taken generally along line 4-4 in FIG. 3.
Figure 4A:
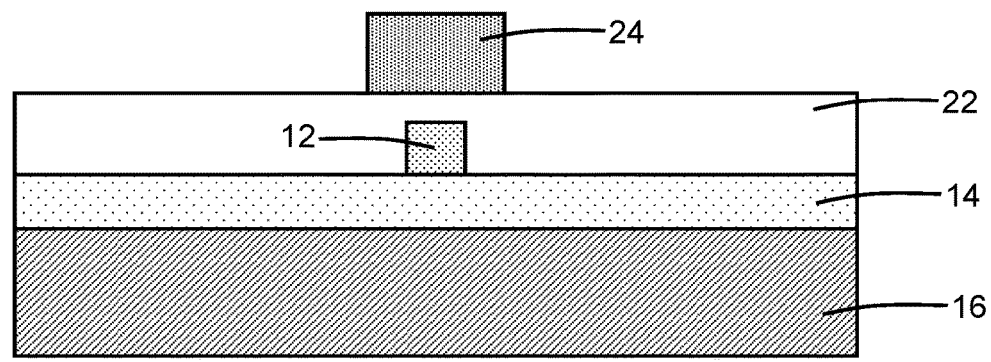
FIG. 4A is a cross-sectional view taken generally along line 4A-4A in FIG. 3

With reference to FIGS. 3, 4, 4A in which like reference numerals refer to like features in FIGS. 1, 2 and at a subsequent fabrication stage, a dielectric layer 22 may be formed over the waveguide core 12. The dielectric layer 22 may be comprised of a dielectric material, such as silicon dioxide, having a refractive index that is less than the refractive index of the material constituting the waveguide core 12. The waveguide core 12 is embedded in the dielectric layer 22, which may be deposited and planarized after deposition, because the dielectric layer 22 is thicker than the height of the waveguide core 12.

The structure 10 for the edge coupler may include a waveguide core 24 that is disposed on and over the dielectric layer 22. The waveguide core 24 may include a tapered section 26, a section 28 connected to the tapered section 26, and an end 29 that terminates the tapered section 26. The tapered section 26 of the waveguide core 24 may be aligned along a longitudinal axis 30. The section 28 of the waveguide core 24 connects the tapered section 26 of the waveguide core 24 to the photonic integrated circuit on the photonics chip. In an embodiment, the section 20 may taper with a width dimension that increases with increasing distance from the end 29. In an embodiment, the width dimension of the section 20 may linearly increase with increasing distance from the end 29. In an alternative embodiment, the width dimension of the section 20 may change based on a non-linear function, such as a quadratic function, a cubic function, a parabolic function, a sine function, a cosine function, a Bezier function, or an exponential function. In an embodiment, the section 20 may have a uniform taper angle as a result of the increasing width dimension. In an alternative embodiment, the section 20 may taper in multiple stages characterized by different taper angles.

In an embodiment, the waveguide core 24 may be comprised of a material having a refractive index that is greater than the refractive index of silicon dioxide. In an embodiment, the waveguide core 24 may be comprised of a different material than the waveguide core 12. In an embodiment, the waveguide core 24 may be comprised of a dielectric material, such as silicon nitride, aluminum nitride, or silicon oxynitride. In an alternative embodiment, other materials, such as a III-V compound semiconductor, may be used to form the waveguide core 24.

The waveguide core 12 is disposed in a vertical direction between the waveguide core 24 and the semiconductor substrate 16. In an embodiment, the tapered section 26 of the waveguide core 24 may have an overlapping relationship with a portion of the waveguide core 12 and a non-overlapping relationship with another portion of the waveguide core 12. In an embodiment, the tapered section 26 of the waveguide core 24 may have an overlapping relationship with a portion of the section 18 of the waveguide core 12 and a non-overlapping relationship with another portion of the section 18 of the waveguide core 12.

The waveguide core 24 has a sidewall 32 and a sidewall 34 that is opposite to the sidewall 32. The sidewalls 32, 34 of the waveguide core 24 in the tapered section 26 converge at the end 29. The section 18 of the waveguide core 12 may curve in a lateral direction away from the longitudinal axis 30 of the tapered section 26. The section 18 extends across the sidewall 32 of the waveguide core 24 and terminates at the end 19. The section 18 of the waveguide core 12 is longitudinally offset from the end 29 along the longitudinal axis 30.

Figure 5:
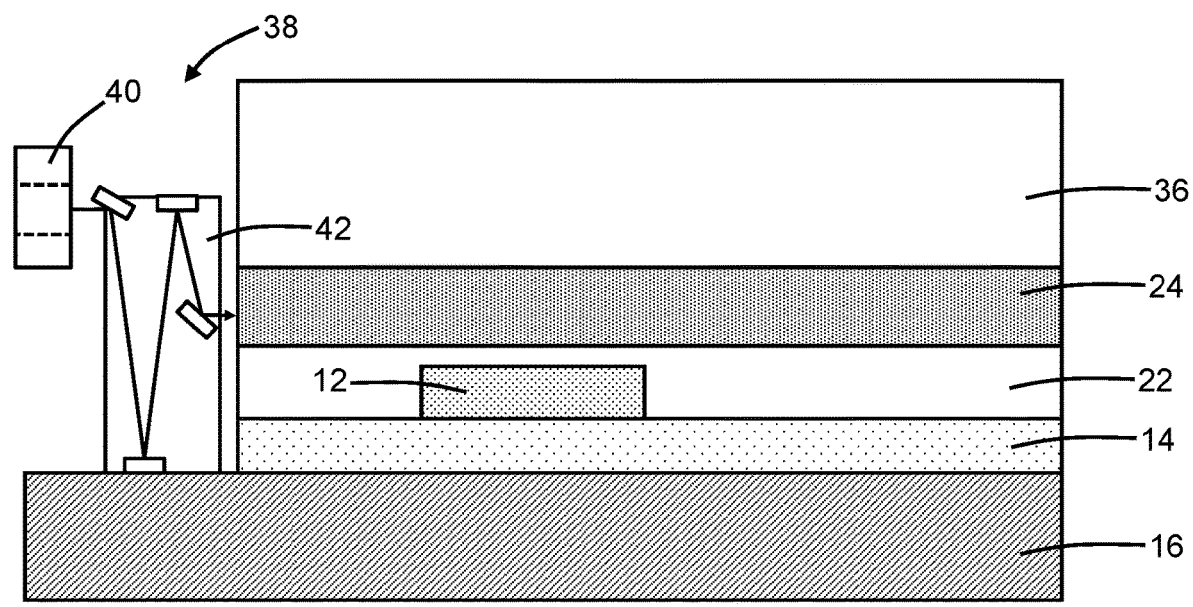
FIGS. 5, 5A are cross-sectional views of the structure at a fabrication stage of the processing method subsequent to FIGS. 3, 4, 4A.
Figure 5A:
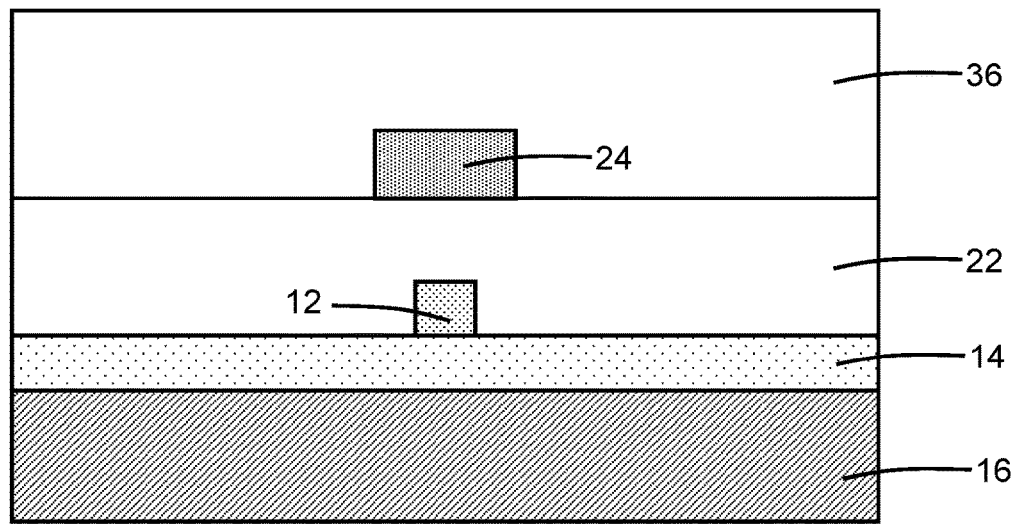

With reference to FIGS. 5, 5A in which like reference numerals refer to like features in FIGS. 3, 4, 4A and at a subsequent fabrication stage, a dielectric layer 36 may be formed over the waveguide core 24. The dielectric layer 36 may be comprised of a homogeneous dielectric material, such as silicon dioxide, having a refractive index that is less than the refractive index of the material constituting the waveguide core 24. The dielectric layer 36 may replace the heterogenous interlayer dielectric layers of a removed section of a back-end-of-line stack (not shown). The waveguide core 24 is embedded in the dielectric layer 36, which may be deposited and planarized after deposition, because the dielectric layer 36 is thicker than the height of the waveguide core 24.

In an embodiment, the structure 10 may include a light source 38 that is disposed adjacent to the end 29 of the tapered section 26 of the waveguide core 24. In an embodiment, the light source 38 may include an optical fiber 40 and an optical coupler 42 that provides a fiber-to-chip optical connection. In an embodiment, the optical coupler 42 may be a photonic bump that includes internal turning mirrors and lensed mirrors that collimate and focus the light from the optical fiber 40 and provide the collimated, focused light to the tapered section 26 of the waveguide core 24. A photonic bump avoids the need to directly attach the tip of the optical fiber 40 to the photonics chip, and eliminates the need for a V-shaped groove in the semiconductor substrate 16 that is normally used to self-align an optical fiber tip to an edge coupler. The photonic bump may also reduce the mode size of the light received from the optical fiber 40. The gap between the end 29 of the tapered section 26 and the optical coupler 42 of the light source 38 may be filled by air or by an index-matching material, such as an optical adhesive.

In use, light may be transferred from the optical fiber 40 to the optical coupler 42 and from the optical coupler 42 to the tapered section 26 of the waveguide core 24. The waveguide core 12 provides a coupling-assistance feature that improves the efficiency of the dual-layer edge coupler by significantly reducing light loss during transfer. Light being received by the tapered section 26 of the waveguide core 24 initially interacts with the section 18 of the waveguide core 12, which aids with providing an adiabatic transition. The section 28 of the waveguide core 24 guides the transferred light away from the structure 10. Alternatively, light may be guided by the section 28 of the waveguide core 24 to the tapered section 26 and transferred by the optical coupler 42 to the optical fiber 40.

The curvature of the section 18 of the waveguide core 12 may mitigate leakage loss from the dual-layer edge coupler to the semiconductor substrate 16. The structure 10 may also enable faster mode conversions for light transferred from the light source 38 to the dual-layer edge coupler. The design and parameterization of the section 18 of the waveguide core 12 may be chosen to optimize the improvement to the coupling performance of the dual edge coupler. The section 18 of the waveguide core 12 may be particularly effect with improving the performance of the dual-layer edge coupler when receiving light with a small mode size from the optical coupler 42. The section 18 of the waveguide core 12 may compensate for the weak confinement of light by the waveguide core 24 resulting from the waveguide core 24 being formed from a dielectric material.

Figure 6:
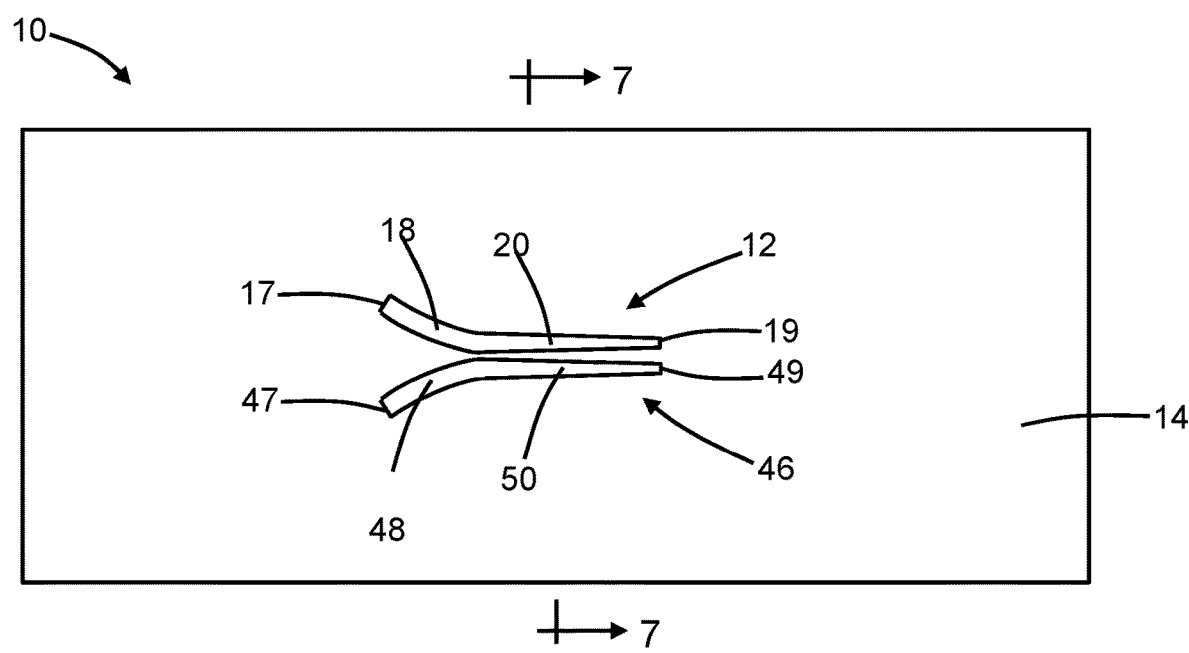
FIG. 6 is a top view of a structure at an initial fabrication stage of a processing method in accordance with alternative embodiments of the invention.
Figure 7:
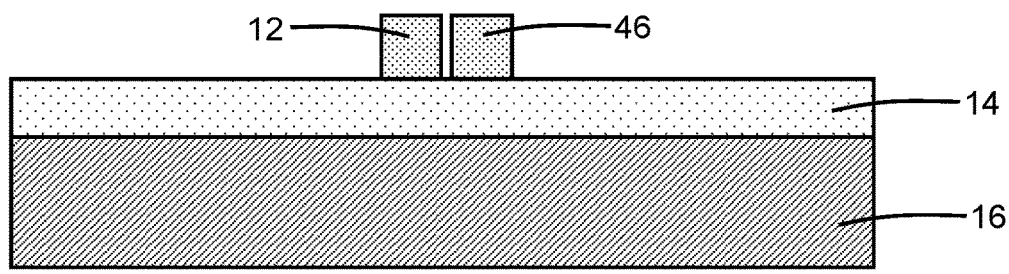
FIG. 7 is a cross-sectional view taken generally along line 7-7 in FIG. 6.

With reference to FIGS. 6, 7 and in accordance with alternative embodiments, the structure 10 may be modified to include another waveguide core 46 is disposed on and over the dielectric layer 14 and semiconductor substrate 16. The waveguide core 46 is arranged adjacent to the waveguide core 12 and is disposed between the waveguide core 24 and the semiconductor substrate 16. The waveguide core 46 may be similar in construction to the waveguide core 12 and, in that regard, the waveguide core 46 may be comprised of the same material as the waveguide core 12 and may be patterned concurrently with the waveguide core 12.

The waveguide core 46 includes a section 48 and a section 50 that is adjoined to the section 48. The waveguide core 46 is truncated at an end 47 that terminates the section 48 and an end 49 that terminates the section 50. The waveguide core 46 has a length between the opposite ends 47, 49 with the section 48 extending over a portion of the length and the section 50 extending over another portion of the length. In an embodiment, the section 48 may include a bend that curves in a lateral direction away from the section 50 to the end 47. In an embodiment, the section 50 may taper with a width dimension that decreases with decreasing distance from the end 49. In an embodiment, the width dimension of the section 50 may linearly increase with increasing distance from the end 49. In an alternative embodiment, the width dimension of the section 50 may change based on a non-linear function, such as a quadratic function, a cubic function, a parabolic function, a sine function, a cosine function, a Bezier function, or an exponential function. In an embodiment, the section 50 may have a uniform taper angle as a result of the increasing width dimension. In an alternative embodiment, the section 50 may taper in multiple stages characterized by different taper angles. In an alternative embodiment, the section 50 may be non-tapered.

Figure 8:
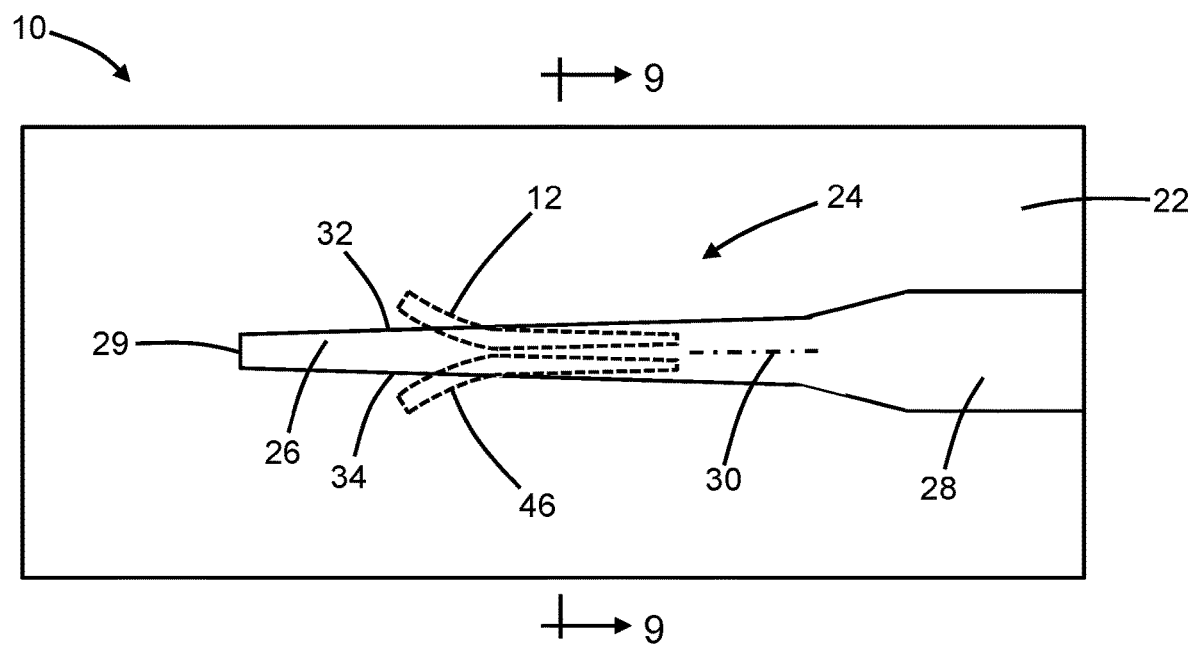
FIG. 8 is a top view of the structure at a fabrication stage of the processing method subsequent to FIG. 7.
Figure 9:
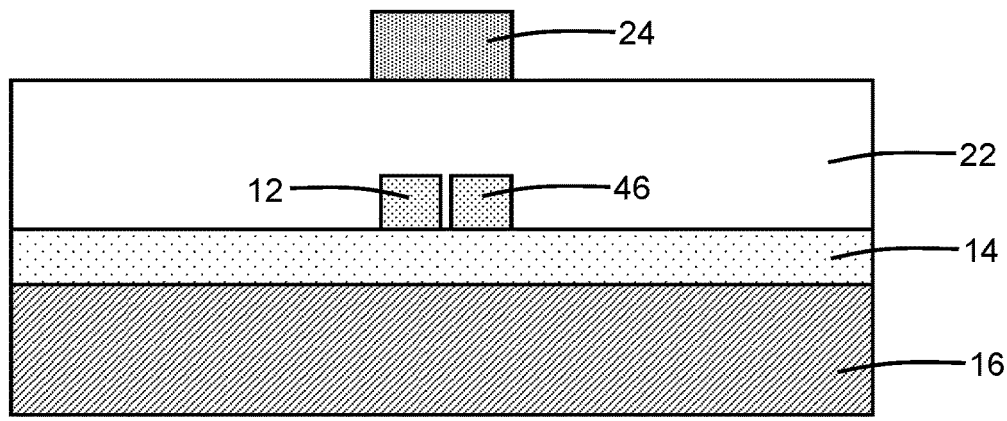
FIG. 9 is a cross-sectional view taken generally along line 9-9 in FIG. 8.

With reference to FIGS. 8, 9 in which like reference numerals refer to like features in FIGS. 6, 7 and at a subsequent fabrication stage, the waveguide core 24 is formed over the dielectric layer 22. The waveguide cores 12, 46 are disposed in a vertical direction between the waveguide core 24 and the semiconductor substrate 16, and the waveguide core 46 is offset from the waveguide core 12 in a lateral direction. The section 18 of the waveguide core 12 and the section 48 of the waveguide core 46 may curve in opposite lateral directions away from the longitudinal axis 30 of the waveguide core 24. In an embodiment, the section 18 of the waveguide core 12 may extend across the sidewall 32 of the waveguide core 24 and terminate at the end 19, and the section 48 of the waveguide core 46 may extend across the sidewall 34 of the waveguide core 24 and terminate at the end 49.

In an embodiment, the waveguide core 12 and the waveguide core 46 may be symmetrically arranged relative to the longitudinal axis of the waveguide core 24. In an embodiment, the waveguide core 24 may have an overlapping relationship with portions of the waveguide core 12, 46 and a non-overlapping relationship with other portions of the waveguide cores 12, 46. In an embodiment, the waveguide core 24 may have an overlapping relationship with portions of the section 18 of the waveguide core 12 and the section 48 of the waveguide core 46, and a non-overlapping relationship with other portions of the section 18 of the waveguide core 12 and the section 48 of the waveguide core 46.

The dielectric layer 36 may be subsequently formed, and the light source 38 may be disposed adjacent to the tapered section 26 of the waveguide core 24. The combination of the waveguide core 12 and the waveguide core 46 may strengthen and reinforce the improvements provided by the waveguide core 12 alone.

Figure 10:
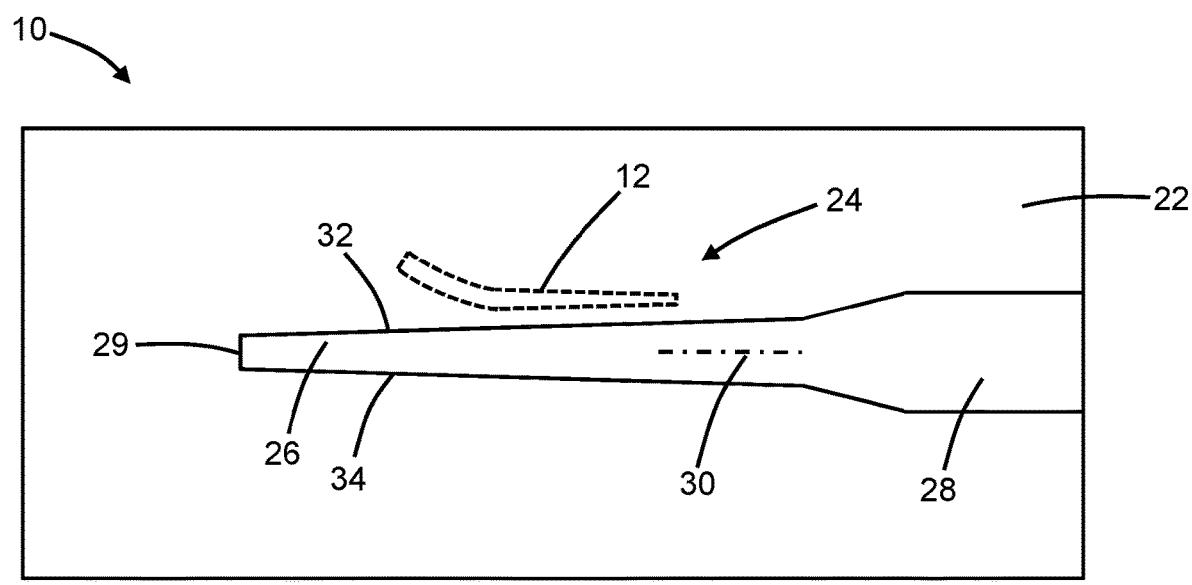
FIG. 10 is a top view of a structure in accordance with alternative embodiments of the invention.

With reference to FIG. 10 in which like reference numerals refer to like features in FIG. 3 and in accordance with alternative embodiments, the structure 10 may be modified such that the waveguide core 12 is positioned adjacent to the sidewall 32 of the waveguide core 24, and the waveguide core 24 has a fully non-overlapping relationship with the waveguide core 12.

Figure 11:
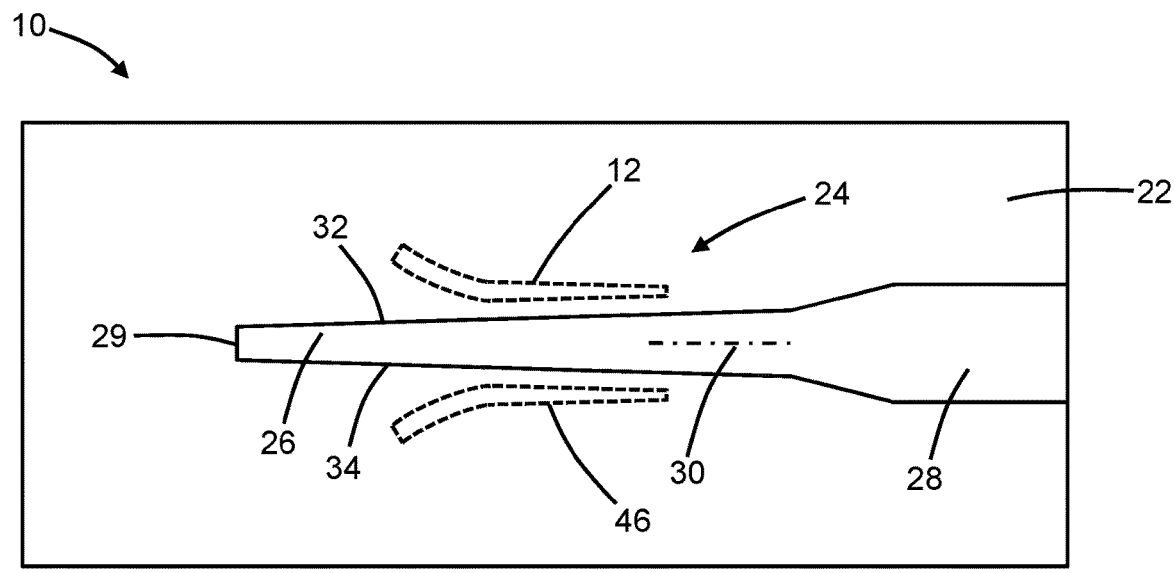
FIG. 11 is a top view of a structure in accordance with alternative embodiments of the invention.

With reference to FIG. 11 in which like reference numerals refer to like features in FIG. 8 and in accordance with alternative embodiments, the structure 10 may be modified to increase the lateral spacing between the waveguide core 12 and the waveguide core 46. In an embodiment, the lateral spacing may be increased such that the waveguide core 12 is positioned adjacent to the sidewall 32 of the waveguide core 24, the waveguide core 46 is positioned adjacent to the sidewall 34 of the waveguide core 24, the waveguide core 24 has a fully non-overlapping relationship with the waveguide core 12, and the waveguide core 24 has a fully non-overlapping relationship with the waveguide core 46.

Figure 12:
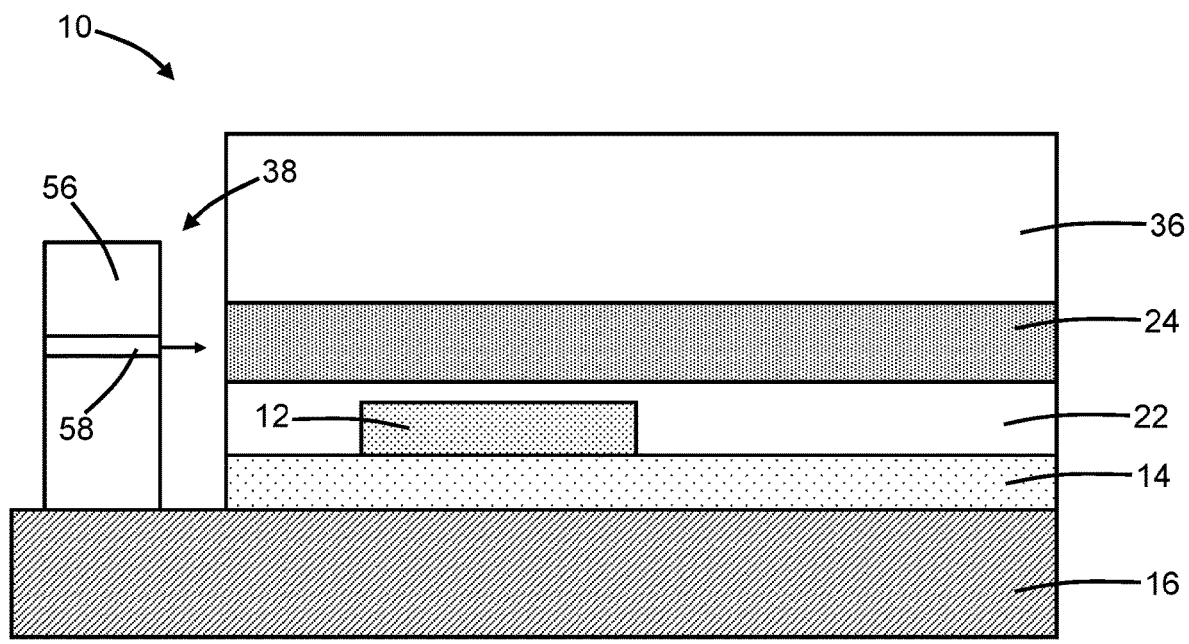
FIG. 12 is a cross-sectional view of a structure in accordance with alternative embodiments of the invention.

With reference to FIG. 12 in which like reference numerals refer to like features in FIG. 5 and in accordance with alternative embodiments, the light source 38 may be a laser chip 56 that disposed adjacent to the end 29 of the tapered section 26 of the waveguide core 24. In an embodiment, the laser chip 56 may include a laser stripe 58 that is aligned with the end 29 of the tapered section 26 of the waveguide core 24. In an alternative embodiment, the laser chip 56 may be replaced by a different type of light source 38, such as a semiconductor optical amplifier or the optical fiber 40 (FIG. 5) without the optical coupler 42.

In an embodiment, the laser chip 56 may be a hybrid laser that is configured to emit laser light of a given wavelength, intensity, mode shape, and mode size. In an embodiment, the laser chip 56 may include a laser comprised of III-V compound semiconductor materials. In an embodiment, the laser chip 56 may include an indium phosphide/indium-gallium-arsenic phosphide laser that is configured to generate and emit continuous laser light in an infrared wavelength range.

Figure 13:
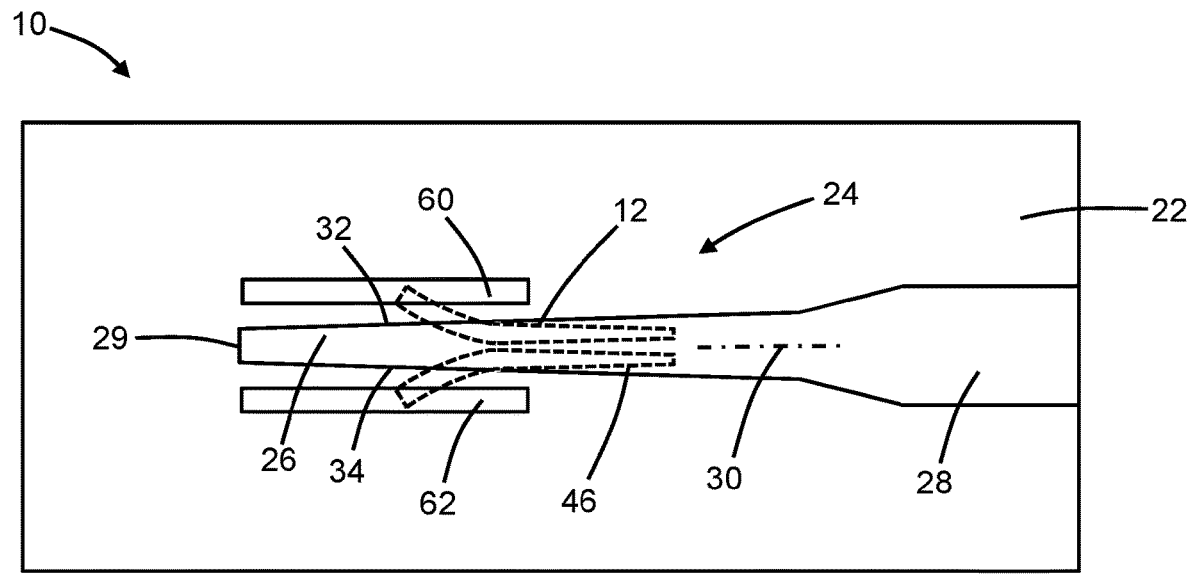
FIG. 13 is a top view of a structure in accordance with alternative embodiments of the invention.

With reference to FIG. 13 in which like reference numerals refer to like features in FIG. 8 and in accordance with alternative embodiments, the structure 10 may be modified to form a multiple-tip edge coupler by adding waveguide cores 60, 62 that are disposed adjacent to the waveguide core 24. The tapered section 26 of the waveguide core 24 is positioned in a lateral direction between the waveguide core 60 and the waveguide core 62. The waveguide core 60, which is truncated at opposite ends, may be positioned adjacent to the sidewall 32 of the waveguide core 24. The waveguide core 62, which is truncated at opposite ends, may be positioned adjacent to the sidewall 34 of the waveguide core 24. In the representative embodiment, the waveguide core 60 may overlap with a portion of the section 18 of the waveguide core 12 adjacent to the end 17, and the waveguide core 62 may overlap with a portion of the section 48 of the waveguide core 46 adjacent to the end 47. In an embodiment, the waveguide core 24 and the waveguide core 60 may overlap with different portions of the section 18 of the waveguide core 12, and the waveguide core 24 and the waveguide core 62 may overlap with different portions of the section 48 of the waveguide core 46.

Figure 14:
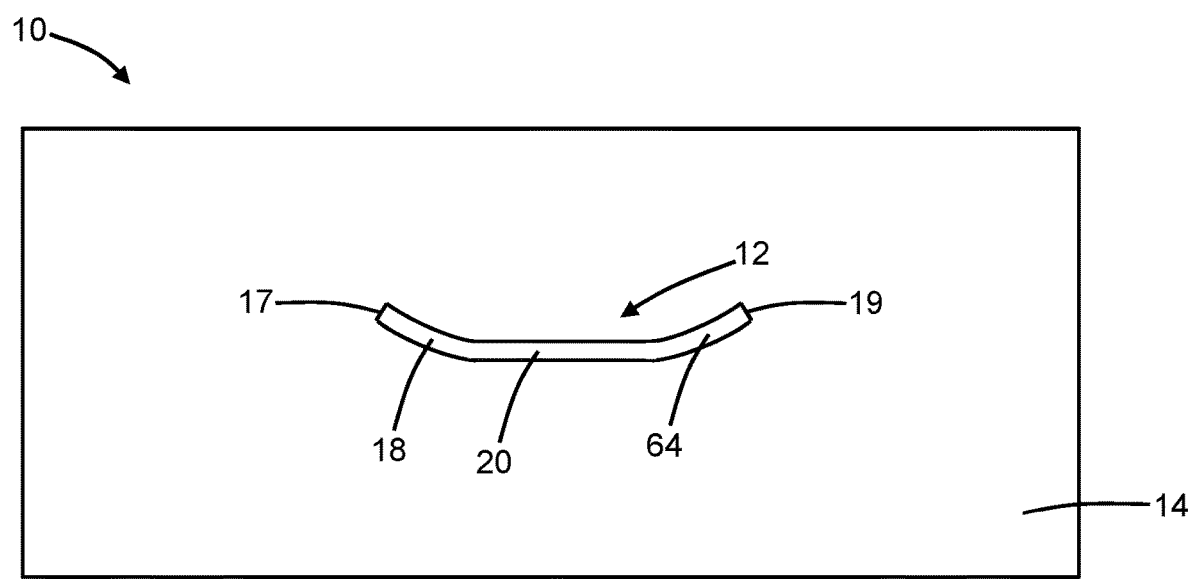
FIG. 14 is a top view of a structure in accordance with alternative embodiments of the invention.

With reference to FIG. 14 in which like reference numerals refer to like features in FIG. 1 and in accordance with alternative embodiments, the structure 10 may be modified to append a section 64 to the section 20 of the waveguide core 12 so that, in the propagation direction of light transferred from the light source 38 to the edge coupler, the waveguide core 12 includes bends at the posterior and the posterior of the section 20. In an embodiment, the section 64 may curve in a lateral direction away from the section 20 to the end 19 that is relocated by the addition of the section 64. In an alternative embodiment, a section similar to section 64 may be appended to the anterior of the section 50 of the waveguide core 46 (FIG. 6).

In alternative embodiments, the section 20 of the waveguide core 12 may have a different configuration, such as a tapered section that is adjoined to the section 18, a tapered section that is adjoined to the section 64, and a linear section that is joined to the tapered sections.

Figure 15:
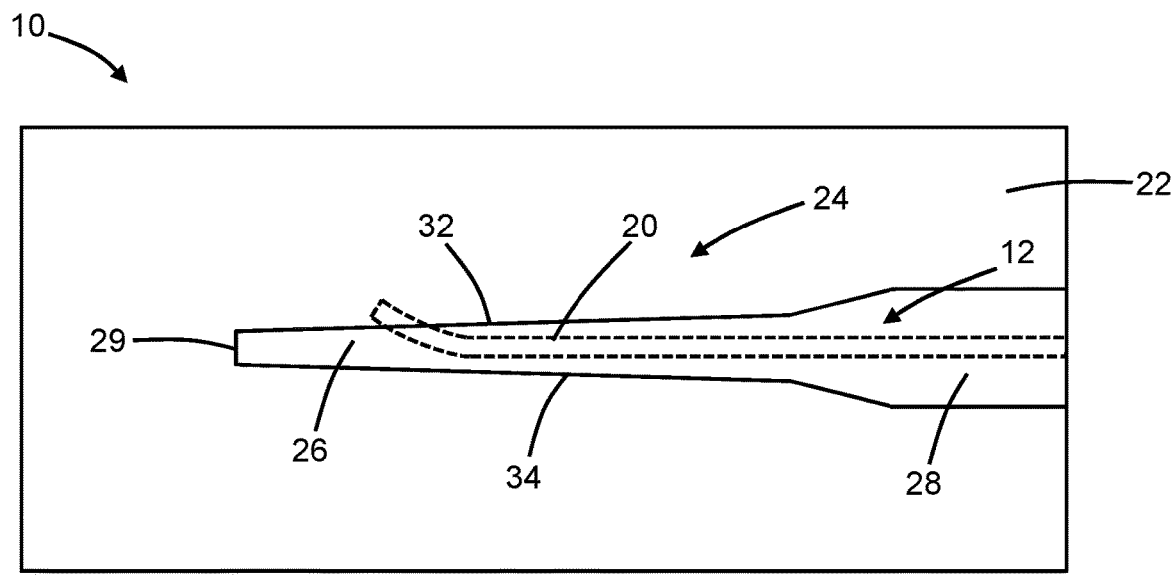
FIG. 15 is a top view of a structure in accordance with alternative embodiments of the invention.

With reference to FIG. 15 in which like reference numerals refer to like features in FIG. 3 and in accordance with alternative embodiments, the section 20 of the waveguide core 12 may extend beneath the section 28 of the waveguide core 24 instead of being truncated at the end 19. The combination of the section 28 of the waveguide core 24 and the section 20 of the waveguide core 12 may define a stacked waveguiding structure that guides light away from the edge coupler to the photonic integrated circuit on the photonics chip.

Figure 16:
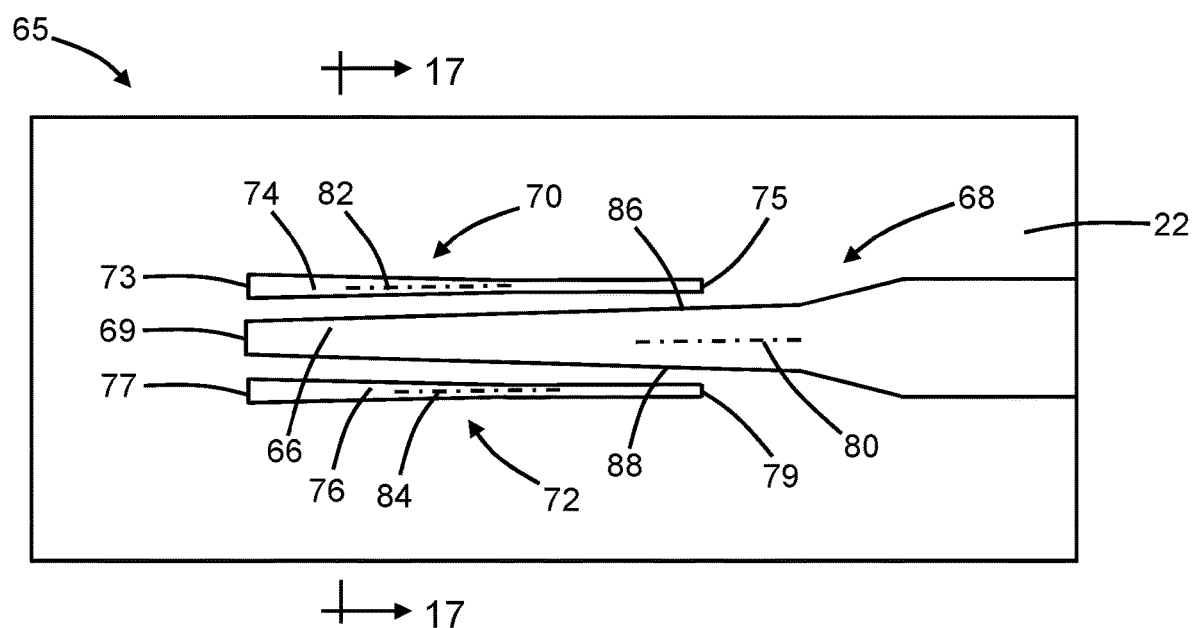
FIG. 16 is a top view of a structure in accordance with alternative embodiments of the invention.
Figure 17:
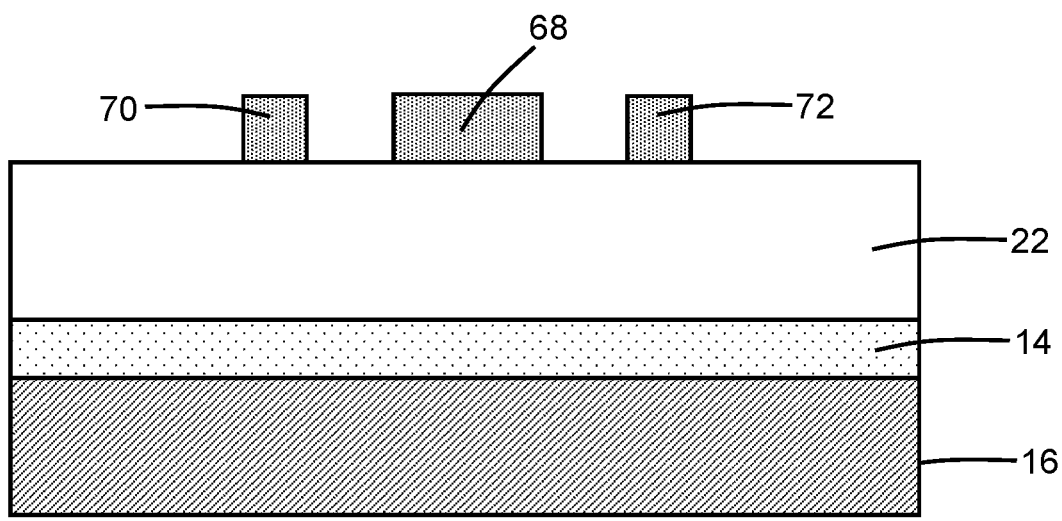
FIG. 17 is a cross-sectional view taken generally along line 17-17 in FIG. 16.

With reference to FIGS. 16, 17 and in accordance with alternative embodiments, a structure 65 for a multiple-tip edge coupler may include a waveguide core 68 having a tapered section 66 and sidewalls 86, 88, a waveguide core 70 having a tapered section 74 disposed in a lateral direction adjacent to a portion of the tapered section 66 of the waveguide core 68 at the sidewall 86, and a waveguide core 72 having a tapered section 76 disposed in a lateral direction adjacent to a portion of the tapered section 66 of the waveguide core 68 at the sidewall 88. The waveguide cores 68, 70, 72 of the multi-tip edge coupler may be configured to improve the balance among coupling loss, leakage loss and mode size. The waveguide core 68 may be coupled to the photonic integrated circuit on the photonics chip.

The waveguide core 68 is truncated at an end 69, and the tapered section 66 of the waveguide core 68 may increase in width dimension with increasing distance from the end 69. The waveguide core 70 is truncated at opposite ends 73, 75, and the tapered section 74 of the waveguide core 70 may decrease in width dimension with increasing distance from the end 73. The waveguide core 72 is truncated at opposite ends 77, 79, and the tapered section 76 of the waveguide core 72 may decrease in width dimension with increasing distance from the end 77. The tapered section 66 of the waveguide core 68 may be aligned along a longitudinal axis 80, the tapered section 74 of the waveguide core 70 may be aligned along a longitudinal axis 82, and the tapered section 76 of the waveguide core 72 may be aligned along a longitudinal axis 84. In an embodiment, the longitudinal axes 80, 82, 84 may be aligned parallel to each other. In an embodiment, the ends 69, 73, 77 may be aligned with each other and lack any longitudinal offset.

The waveguide cores 68, 70, 72 of the structure 65 may be disposed on the dielectric layer 22 that is arranged over the dielectric layer 14 and semiconductor substrate 16. In an embodiment, the waveguide cores 68, 70, 72 may be comprised of a material having a refractive index that is greater than the refractive index of silicon dioxide. In an embodiment, the waveguide cores 68, 70, 72 may be comprised of a dielectric material, such as silicon nitride, aluminum nitride, or silicon oxynitride.

The dielectric layer 36 may be subsequently formed, and the light source 38 may be disposed adjacent to the edge coupler defined by the waveguide cores 68, 70, 72. In an embodiment, the optical fiber 40 and the optical coupler 42 (FIG. 5) may be disposed adjacent to the edge coupler defined by the waveguide cores 68, 70, 72. In an embodiment, the laser chip 56 (FIG. 12) may be disposed adjacent to the edge coupler defined by the waveguide cores 68, 70, 72.

The multi-tip edge coupler embodied in the structure 65 may exhibit a reduced insertion loss and optical return loss for light of either transverse magnetic polarization or transverse electric polarization that is received from the light source 38. In particular, the insertion loss and optical return loss may be significantly reduced for light of transverse magnetic polarization received from the light source 38.

In an alternative embodiment, additional waveguide cores may be disposed adjacent to the waveguide cores 70, 72 to expand the number of tips in the multi-tip edge coupler. In an alternative embodiment, the waveguide cores 68, 70, 72 may be tilted relative to the arriving light from the light source 38 in order to reduce back reflection. In an alternative embodiment, all or a portion of the waveguide cores 68, 70, 72 may be segmented to produce subwavelength gratings. In an alternative embodiment, all or a portion of the waveguide core 68 may be segmented to produce a subwavelength grating that is flanked on opposite sides by the non-segmented waveguide cores 70, 72.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
    a semiconductor substrate;
    a dielectric layer on the semiconductor substrate;
    a first waveguide core on the dielectric layer, the first waveguide core including a first curved section and a first end that terminates the first curved section;
    a second waveguide core including a first section that is tapered; and
    a third waveguide core on the dielectric layer, the third waveguide core including a curved section and an end that terminates the curved section,
    wherein the first waveguide core is positioned between the second waveguide core and the semiconductor substrate, the third waveguide core is positioned between the second waveguide core and the semiconductor substrate, the second waveguide core overlaps with a portion of the first curved section of the first waveguide core, and the second waveguide core overlaps with a portion of the curved section of the third waveguide core.

2. The structure of claim 1 wherein the second waveguide core includes an end that terminates the first section, and further comprising:
    a laser chip disposed adjacent to the end of the second waveguide core, the laser chip configured to direct light to the edge coupler.

3. The structure of claim 1 wherein the second waveguide core includes an end that terminates the first section, and further comprising:
    a photonics bump disposed adjacent to the end of the first section of the second waveguide core, the photonics bump including a plurality of mirrors configured to direct light from an optical fiber to the first section of the second waveguide core.

4. The structure of claim 1 wherein the second waveguide core includes a first sidewall and a second sidewall opposite to the first sidewall, the first curved section of the first waveguide core is disposed adjacent to the first sidewall, and the curved section of the third waveguide core is disposed adjacent to the second sidewall.

5. The structure of claim 4 wherein the first curved section of the first waveguide core extends across the first sidewall of the second waveguide core, and the curved section of the third waveguide core extends across the second sidewall of the second waveguide core.

6. The structure of claim 1 wherein the first waveguide core includes a second curved section and a second end that terminates the second curved section.

7. The structure of claim 1 wherein the first section of the second waveguide core terminates at an end, and the first end of the first waveguide core is longitudinally offset from the end of the first section of the second waveguide core.

8. The structure of claim 1 wherein the first waveguide core comprises a first material, and the second waveguide core comprises a second material different from the first material.

9. The structure of claim 1 wherein the first waveguide core comprises single-crystal silicon, and the second waveguide core comprises silicon nitride.

10. The structure of claim 1 wherein the second waveguide core includes a second section, and the first waveguide core includes a second section that extends beneath the second section of the second waveguide core to define a waveguiding structure.

11. A method of forming a structure for an edge coupler, the method comprising:
    forming a first waveguide core on a dielectric layer, wherein the first waveguide core includes a curved section and an end that terminates the curved section, and the dielectric layer is positioned on a semiconductor substrate;

forming a second waveguide core that includes a section; and forming a third waveguide core on the dielectric layer, wherein the third waveguide core includes a curved section and an end that terminates the curved section, wherein the first waveguide core is positioned between the second waveguide core and the semiconductor substrate, the third waveguide core is positioned between the second waveguide core and the semiconductor substrate, the second waveguide core overlaps with a portion of the curved section of the first waveguide core, and the second waveguide core overlaps with a portion of the curved section of the third waveguide core.

12. The structure of claim 7 wherein the end of the third waveguide core is longitudinally offset from the end of the first section of the second waveguide core.

13. The structure of claim 12 wherein the second waveguide core includes a first sidewall and a second sidewall opposite to the first sidewall, the first curved section of the first waveguide core is disposed adjacent to the first sidewall, and the curved section of the third waveguide core is disposed adjacent to the second sidewall.

14. The structure of claim 13 wherein the first curved section of the first waveguide core extends across the first sidewall of the second waveguide core, and the curved section of the third waveguide core extends across the second sidewall of the second waveguide core.

15. The structure of claim 8 wherein the third waveguide core comprises the first material.

16. The structure of claim 9 wherein the third waveguide core comprises single-crystal silicon.

17. The structure of claim 1 wherein the first waveguide core and the third waveguide core comprise polysilicon, and the second waveguide core comprises silicon nitride.

18. The structure of claim 1 wherein the first waveguide core includes a tapered section adjoined to the first curved section, the first section of the second waveguide core terminates at an end, and the first end of the first waveguide core is longitudinally offset from the end of the first section of the second waveguide core.

19. The structure of claim 18 wherein the third waveguide core includes a tapered section adjoined to the curved section, and the end of the third waveguide core is longitudinally offset from the end of the first section of the second waveguide core.

20. The structure of claim 19 wherein the first waveguide core and the third waveguide core comprise silicon, and the second waveguide core comprises silicon nitride.

* * * * *